United States Patent [19]
Kurisu

[11] Patent Number: 5,984,066
[45] Date of Patent: Nov. 16, 1999

[54] AUTOMOTIVE TRANSMISSION

[76] Inventor: Mikio Kurisu, 1117-93 Tsuzu, Iwakuni-shi, 740, Japan

[21] Appl. No.: 08/997,606

[22] Filed: Dec. 23, 1997

[30] Foreign Application Priority Data

Dec. 26, 1996 [JP] Japan .................................. 8-359978

[51] Int. Cl.⁶ .................................................. F16H 49/00
[52] U.S. Cl. .............................................. 192/60; 476/47
[58] Field of Search ................................. 192/38, 65, 60; 476/47; 475/166, 170; 74/116, 117

[56] References Cited

U.S. PATENT DOCUMENTS

| | | | |
|---|---|---|---|
| 825,416 | 7/1906 | Rice | 192/60 |
| 1,463,975 | 8/1923 | Scotford | 192/60 |
| 1,880,748 | 10/1932 | Bower | 192/60 |

*Primary Examiner*—Richard M. Lorence
*Attorney, Agent, or Firm*—Young & Thompson

[57] ABSTRACT

A transmission, capable for use in a wide variety of applications, allows continuously variable output/input ratios. In all embodiments, rotational input motion is converted into reciprocal motion of a reciprocating shaft. Resistance to the reciprocal motion causes some of the input motion to be converted into rotational motion of an output shaft. The amount of reciprocal motion induced by the input rotational motion is controllable in all embodiments. An output/input ratio range of zero to one is available.

13 Claims, 7 Drawing Sheets

AUTOMOTIVE TRANSMISSION

BACKGROUND OF THE INVENTION

1. Field of the Invention

The present invention relates to a transmission apparatus, particularly an automotive transmission, and more particularly a continuously variable automotive transmission.

2. Description of the Prior Art

There are several types of known automotive transmissions which do not utilize gears. Amongst these are belt type, cam type, ring-corn type, toroidal type, and a differential with a combination of a variable oil pump and an oil motor.

Belt type transmissions alter the output/input rotation ratio by changing the radius ratio between a set of two V-pulleys. Such a mechanism necessitates frictional force between the belt and the pulleys. This frictional force exists independent of rotation of the pulleys, and exacts a price both in resistance (and hence efficiency) and a reduced lifetime of component parts. Additionally, this sort of transmission cannot provide a zero or nearly zero rotation ratio by virtue of its design.

A cam type transmission, which combines a cam with a one-way clutch, has many disadvantages. These disadvantages include a relatively narrow rotation ratio from zero to approximately ¼; relatively large resistance due to the existence of many friction points in links and one-way clutches; a great many structural elements; and a rather large size.

With respect to the ring-corn type and the toroidal type, the disadvantages include the requirement that structural elements be manufactured with high precision, as power is conveyed by friction caused by subtle elasticity or an automatic pressure device between an input disk, an output disk, and a tapered roller or idler roller. Also, conveyable torque is relatively low since a very limited contact area must be used in order to avoid brake effect, which will occur with a wider contact area. Finally, an output rotation of zero is unobtainable because of structural limitations and/or abrasion problems.

A typical automotive transmission, using a differential gear system, performs a transmission function, including a zero output ratio, by using three shafts of the differential gear to an input shaft, an output shaft, and a control shaft. The control shaft is connected to an oil pump, which includes an adjustable control valve.

This type of differential gear transmission suffers from a great many structural elements, a complicated and large structure due to a combination of the differential gear with the oil pump, and difficulty with torque conveyance when the output ratio is lowered, because the control valve is loosened to lower the output rotation. When the control valve is thus loosened, the oil in the oil pump flows freely, and thus conveys no power.

An automotive transmission which combines an oil pump with an oil motor also has the drawback of a large number of elements resulting in a heavy and bulky structure, given that it is a combination of two almost identical units, as each can be used as a pump.

SUMMARY OF THE INVENTION

It is a principal object of the present invention to provide an automotive transmission which is structurally simple, small, and light weight.

It is a further object of the invention to provide an automotive transmission with reduced abrasion and increased durability.

It is a still further object of the invention to provide an automotive transmission in which the rotation ratio varies from zero to a maximum value either continuously or non-continuously, and with torque conveyance.

A yet further object of the invention is to provide a transmission which is applicable through a range from light duty applications such as bicycles through heavy duty uses such as automobiles.

A yet still further object of the invention is to provide an automotive transmission which requires fewer parts than are often required with other designs, resulting in lower material costs.

Yet another object of the invention is to provide an automotive transmission which does not require high precision in manufacturing, resulting in lower production costs and higher productivity.

These and other objects of the invention are achieved through a device which translates rotational motion of a first shaft into reciprocal motion of an intermediate body, which is in turn translated into rotational motion of a second shaft.

In one embodiment, a first shaft terminates in the closed end of a drum. Within the drum is disposed a cavity which lies at an angle to the common axis of rotation of the first and second shafts.

The second shaft terminates in a passage holding a reciprocating shaft whose reciprocal motion is along an axis lying generally perpendicular to the common axis of rotation. The length of the reciprocating shaft is such that it just fits within the cavity disposed within the drum while contacting the interior surface thereof when the first and second shafts are aligned. The cavity may be arranged so that at a low ratio end its cross-sectional center corresponds to the common rotational axis. At the other, high ratio end, the cavity may be displaced from the common rotational axis. Over its length, the cavity may smoothly transition between the two end profiles.

With such an arrangement, and assuming frictionless contact between the ends of the reciprocating shaft and the interior of the cavity, when the first and second shafts are located such that the reciprocating shaft is at the low ratio end of the cavity, rotation of the first shaft, and hence the attached drum, will tend to induce neither reciprocating motion nor rotation in the reciprocating shaft. This is because the cross section of the cavity contacted by the ends of the reciprocating shaft is unvarying, given that it is a circle centered about the common axis of rotation.

On the other hand, if the relative positions of the first and second shafts is altered so that the reciprocating shaft contacts the interior of the cavity at a cross-section other than the low ratio, centered end, rotation of the first shaft and the attached drum will present the reciprocating shaft with a contact path which rotates eccentrically around the common axis of rotation. Assuming there is no resistance to the linear motion of the reciprocating shaft, it will slide back and forth, completing one period of its motion with each revolution of the first shaft. Necessarily, the amount of displacement of the reciprocating shaft away from its center point is a function of the amount by which the cross-section of the cavity in contact with the reciprocating shaft is displaced from the common axis of rotation.

If, in addition to the arrangement discussed above, there is resistance to the reciprocal motion of the reciprocating shaft, the rotational motion of the first shaft will be converted into both reciprocal motion of the reciprocating shaft and rotational motion of the second shaft, within which the reciprocating shaft is slidably attached. If the eccentricity of the contact path that the drum presents to the reciprocating shaft is extreme, a rotational motion which is a component of the force of the rotation of the first shaft (the remainder being converted into reciprocal motion) becomes infinite, resulting in all of the rotational motion of the first shaft being converted into rotational motion of the second shaft. By controlling the placement of the reciprocating shaft in the cavity, a continuous output/input rotation ratio range from 0 to 1 is achievable.

In a second embodiment of the invention, the arrangement of the first and second shafts is similar. Instead of the being disposed at an angle to the common axis, however, the cavity is centered about the common axis of rotation. As with the previous embodiment, the profile of the cavity varies over its length. At a low ratio end, the cross-section may be circular, or nearly so. At a high ratio end, the cross-section is increasingly flattened. Over its length, the cavity may smoothly transition between the two end profiles.

The single reciprocating shaft of the first embodiment is replaced with a plurality of shafts which fit into passages in the end of the second shaft. These passages allow the shafts to extend outward, generally perpendicular to the axis of rotation of the second shaft. The passages open into a common fluid-filled chamber within the second shaft. With the shafts so arranged, the movement of one or more of the shafts toward the center of the second shaft forces at least one of the remaining shafts to move outward, due to displacement of the fluid in the chamber.

With a proper arrangement of the shafts and shape of the cavity, the first and second shafts can be arranged such that the reciprocating shafts are inside the cavity with the ends of all of the reciprocating shafts touching the interior surface of the cavity for all points along the length of the cavity.

With such an arrangement, it can be seen that rotation of the first shaft, and hence the drum containing the variable profile cavity, causes varying reactions in the reciprocating shafts depending upon the location of the shafts in relation to the cavity. If the cross-section of the cavity seen by the reciprocating shafts is circular, the rotation of this cross-section will tend to induce no motion in the shafts, assuming frictionless contact between the ends of the reciprocating shafts and the interior of the cavity. If the cross-section seen by the reciprocating shafts is flattened, however, as the cross-section rotates, it will tend to induce only reciprocal motion in the reciprocating shafts, assuming no resistance to such motion in the second shaft. This alteration of the cross-section can be accomplished by moving the first and second shafts in relation to one another, so that the reciprocating shafts contact various portions of the inside of the cavity.

As with the first embodiment, the addition of resistance to the movement of the reciprocating shafts within the passages will cause the rotational motion of the first shaft to be converted into both reciprocal motion of the reciprocating shafts and rotational motion of the second shaft. By controlling the placement of the reciprocating shafts in the cavity, a continuous output/input rotation ratio range of 0 to 1 is available.

In a third embodiment, the first shaft terminates in a selectively pivotable rotor. Followers are slidably attached to the perimeter of the rotor on one end and terminate in a piston on the opposite end. The piston end of the followers fits inside cylinders which are hingably attached to a non-pivotable rotor which is attached to the end of a second shaft. The cylinders act as fluid chambers and are interconnected by fluid passages.

With the pivoting rotor set to a 0° angle, such that the plane of the rotor lies perpendicular to the first shaft's axis of rotation, rotation of the first shaft tends to induce no reciprocal motion in the followers, assuming frictionless contact between the followers and the rotor. As the rotor spins, the slidable contact point between rotor perimeter and the followers does not move linearly parallel to the longitudinal direction of the first shaft.

If, however, the pivoting rotor is pivoted and the first shaft is rotated, the pivoting rotor will wobble as it rotates. This wobble, the linear portion of the motion, will be entirely translated into reciprocal motion of the followers, assuming no resistance to the reciprocal motion in the cylinders. Furthermore, the greater the pivot, the greater the wobble, and the greater the reciprocal motion.

As with the previous embodiments, if resistance is added to the reciprocal motion, such as forced fluid flow through interconnected fluid passages, some portion of the rotation of the first shaft will be converted into reciprocal motion and the balance will be converted into rotational motion of the second shaft. By controlling the pivot amount and the resistance to reciprocal motion, the output/input rotation ratio is continuously variable through the entire range of 0 to 1.

All embodiments can be viewed as an input/output conversion device which uses an incline plane as part of the energy conversion. The angle of the incline plane is adjustable and adjusts the influence of the input portion of the transmission on the output portion. As the angle of the incline plane increases, the output/input ratio tends to increase.

BRIEF DESCRIPTION OF THE DRAWINGS

The above and other objects and advantages of the invention will be more readily apparent from the following detailed description, which reference to the accompanying drawings, in which.

DETAILED DESCRIPTION OF THE PREFERRED EMBODIMENTS

Figure 1:
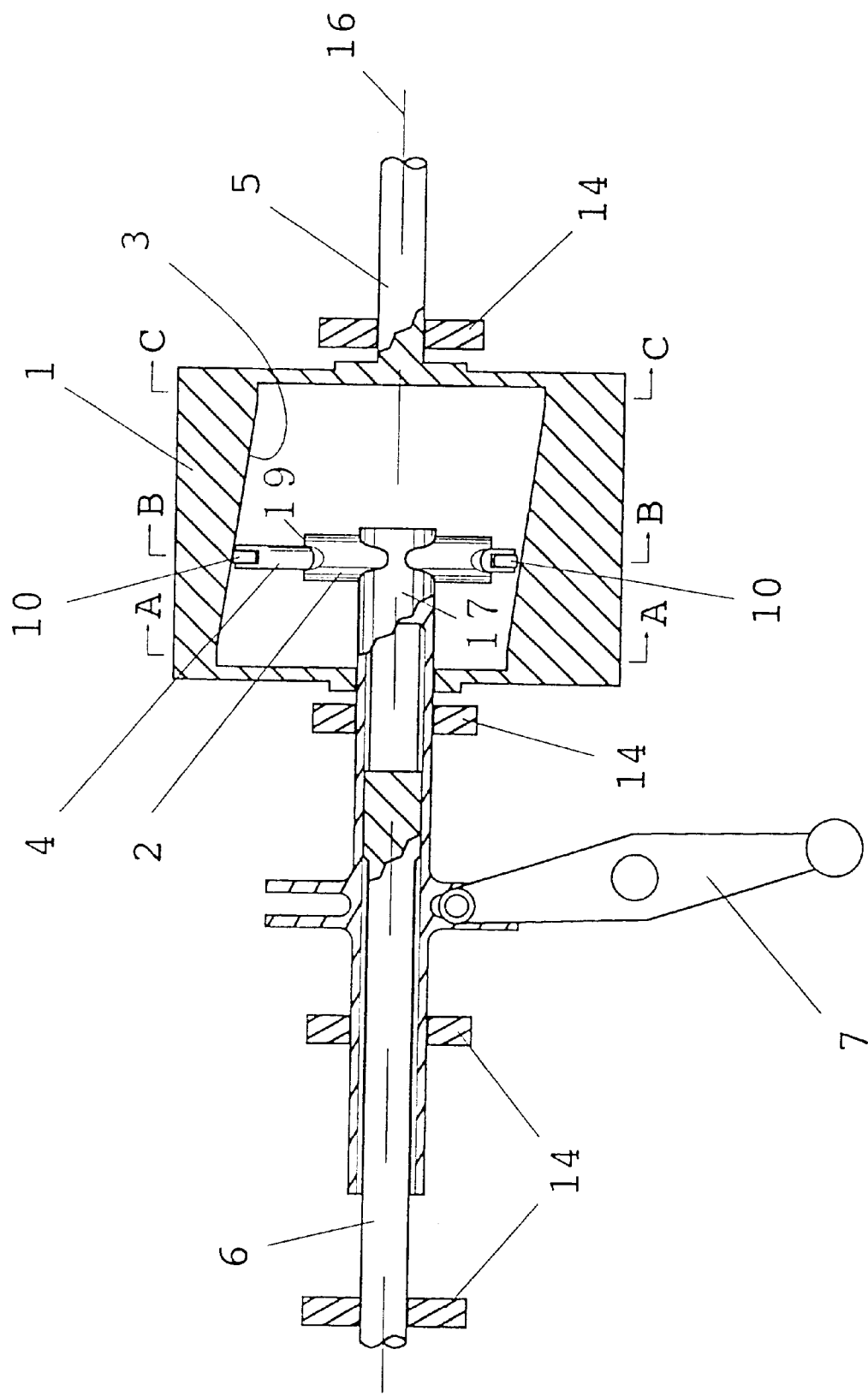
FIG. 1 is a side and sectional view of a first embodiment of an automotive transmission according to the invention.

Referring now to the accompanying drawings, FIG. 1 shows an automotive transmission according to a first embodiment of the invention. First shaft 5, second shaft 6, sliding shaft 17, and drum 1 share a common axis of rotation 16. Drum 1 is rigidly attached to first shaft 5. A cavity having walls 3 is formed in the interior of drum 1, and lies generally at an angle to axis 16.

The left side of drum 1 as seen in FIG. 1 incorporates an opening which accommodates sliding shaft 17 which can freely rotate as well as slide longitudinally into and out of drum 1. Sliding shaft 17 terminates at a transmission end in sleeve 2, to which it is rigidly attached. A cylinder 19 is formed within sleeve 2, the axis of symmetry of which may pass through, and be perpendicular to, axis 16. Reciprocating shaft 4 is disposed within cylinder 19 in sleeve 2, and can slide back and forth therein.

Figure 2:
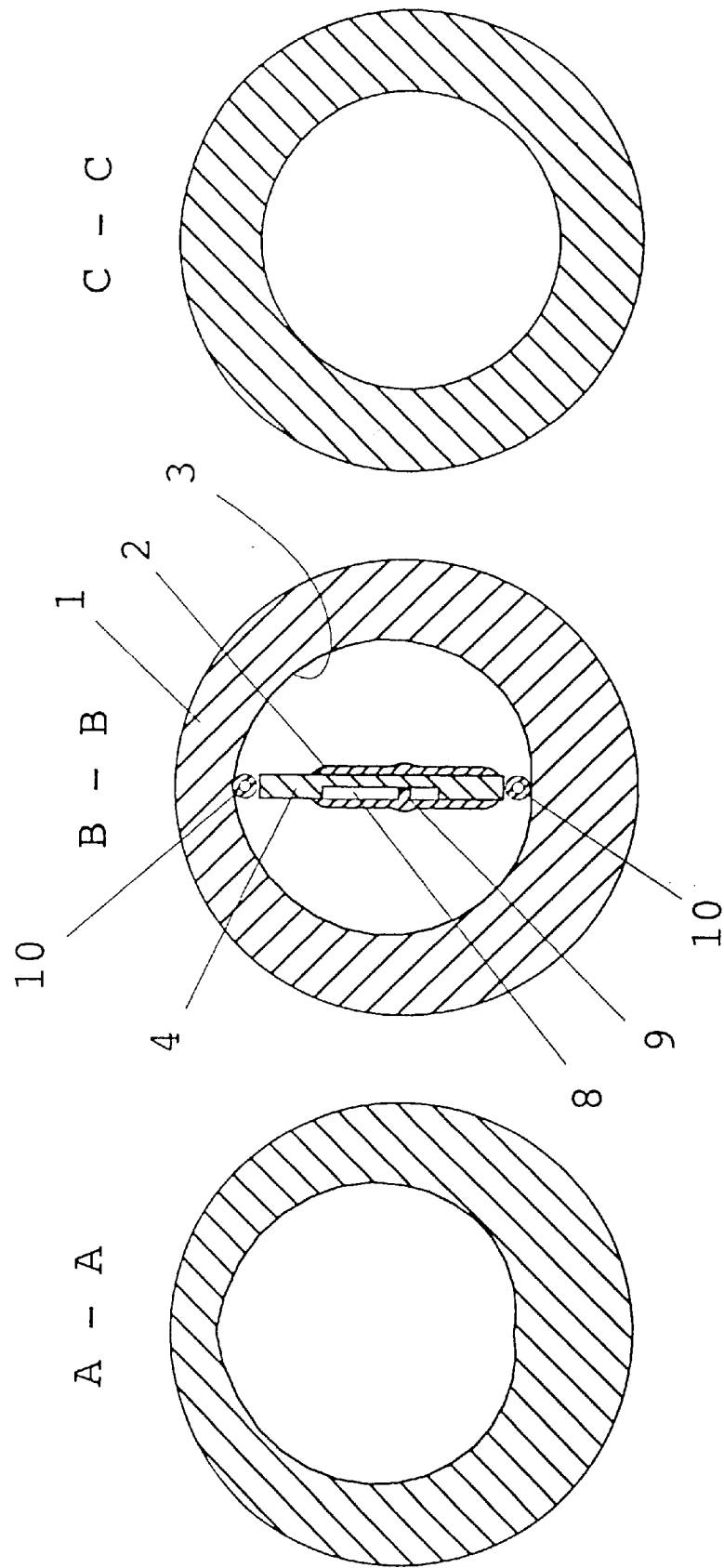
FIG. 2 is a cross section view of a first embodiment taken at A—A, B—B and C—C of FIG. 1.

As seen in FIG. 2, cross sections of drum 1 include openings defined by walls 3. This opening may be circular and centered about axis 16, as it is at cross-section C—C. At other cross-sections, the interior opening may be non-circular and offset from the axis 16. If the opening is offset, the shape of the interior opening must be such that the first and second shaft can rotate independently, and such rotation tends to induce reciprocal motion in reciprocating shaft 4.

At any given point, the profile of the interior of drum 1 must be such that if the interior shape is rotated about axis 16, the distal ends of reciprocating shaft 4 will both be in contact with interior wall 3. An imaginary line connecting any two points on interior wall 3 which are in instantaneous contact with the ends of reciprocating shaft 4 necessarily passes through axis 16.

One such shape can be formed by defining, as a starting point, an initial, minimum displacement distance from axis 16. This displacement distance must be less than half the length of reciprocating shaft 4. Similarly, a maximum displacement distance is defined as being disposed from axis 16 directly opposite the minimum displacement point. The sum of the minimum and maximum displacement distances must equal the length of reciprocating shaft 4.

As an angle of rotation centered on axis 16 is swept from the minimum displacement point through 180° to the maximum displacement point, the displacement distance increases smoothly. One such smooth increase is to have the displacement distance increase in direct proportion to the angle of rotation. Such an approach produces a profile which resembles a heart shape, with an inward pointing discontinuity at the minimum displacement point and an outward pointing discontinuity at the maximum displacement point.

The ends of reciprocating shaft 4 may terminate in rollers 10, through which reciprocating shaft 4 is in constant contact with interior walls 3 of drum 1. Alternatively, rollers 10 may be replaced with any other mechanism which provides rolling or sliding contact between the ends of reciprocating shaft 4 and interior walls 3.

Sliding shaft 17 is attached to second shaft 6 such that sliding shaft 17 can slide longitudinally with respect to second shaft 6, but the two rotate as a unit. Such an arrangement could be accomplished through a splined interconnection, for example.

Figure 5:
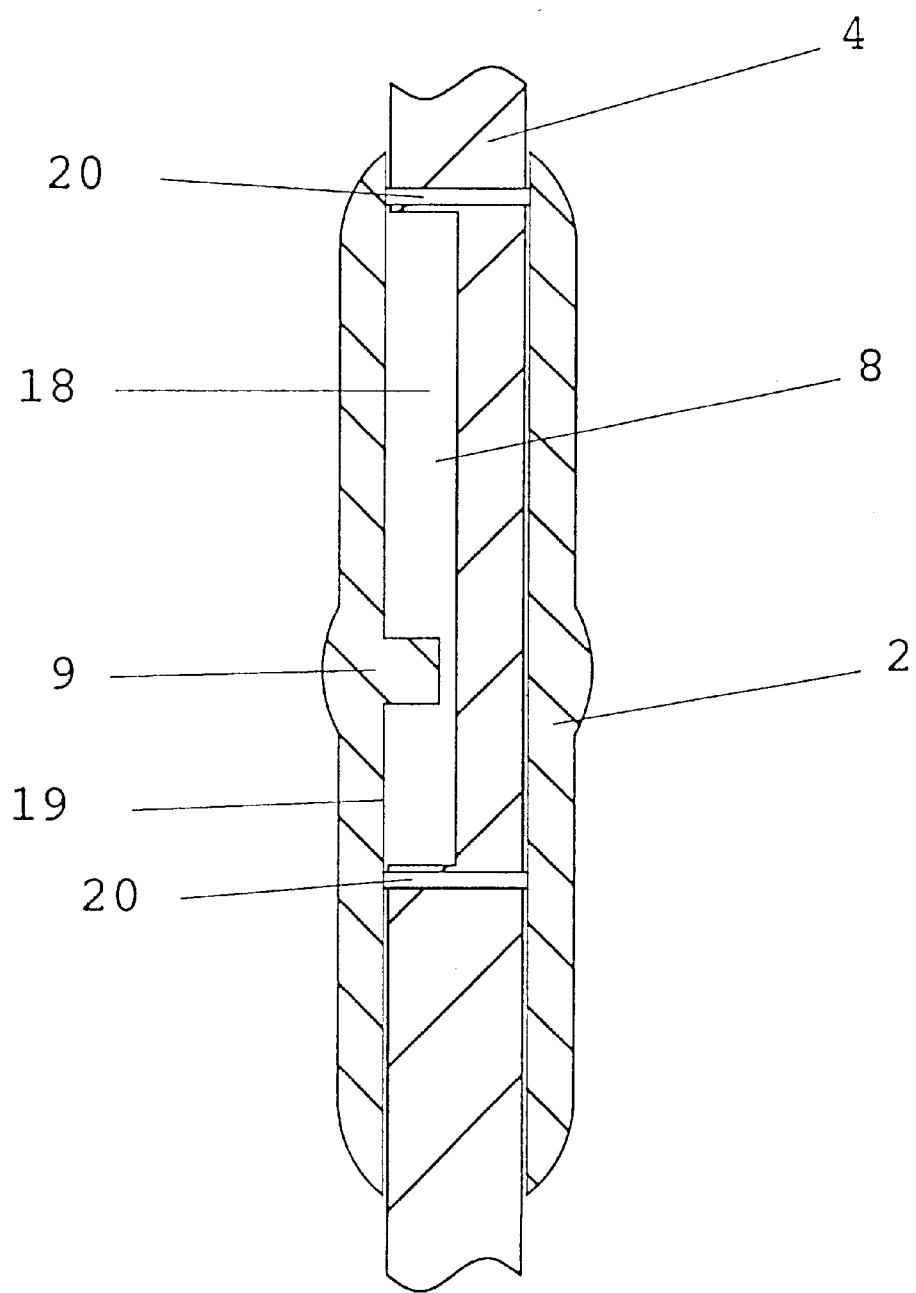
FIG. 5 is a detailed cross-sectional view of a portion of one embodiment.

FIG. 2, at section B—B, shows not only a cross section of drum 1, but also of reciprocating shaft 4. This is shown in greater detail in FIG. 5. Groove 8 can be seen which extends lengthwise within reciprocating shaft 4 and is contained within sleeve 2 throughout the full range of linear motion of reciprocating shaft 4. Groove 8 and the interior of cylinder 19 together form a fluid chamber 18, which may be filled with oil or another appropriate fluid. Reciprocating shaft 4 may be equipped with seals 20 at either end of groove 8. These seals 20 prevent fluid from leaking from fluid chamber 18, while still allowing reciprocating shaft 4 to freely move within cylinder 19 of sleeve 2.

A baffle 9 attached to the interior wall of cylinder 19 of sleeve 2 may extend into fluid chamber 18, effectively dividing fluid chamber 18 into a plurality of subchambers. One or more passages between baffle 9 and the wall of groove 8 allow a restricted flow of fluid from one subchamber to the next. It can be seen that reciprocal motion of reciprocating shaft 4 necessitates such a flow of fluid. Baffle 9, therefore, provides resistance to the reciprocal movement of reciprocating shaft 4.

Figure 6:
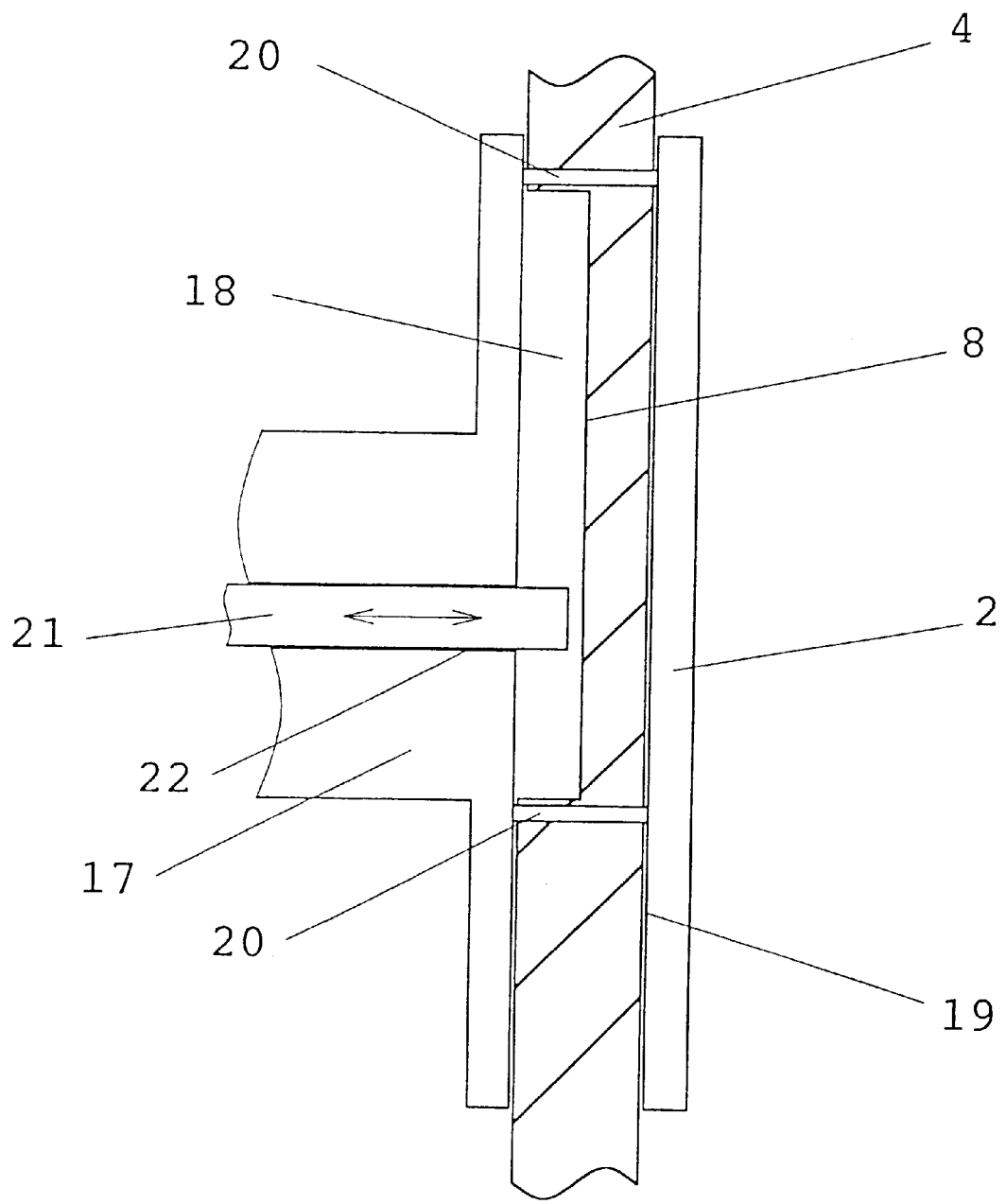
FIG. 6 is a detailed cross-sectional view of a portion of another embodiment.

As seen in FIG. 6, baffle 9 may be replaced with adjustable baffle 21. In this case, adjustable baffle 21 is a rod which is slidably contained within sliding shaft 17 and passes through aperture 22 in sleeve 2. Through a control mechanism (not shown), adjustable baffle 21 may be moved back and forth in a longitudinal direction, as indicated by the arrow and ghost image. With such an arrangement, the resistance to the flow of fluid between subchambers necessitated by linear motion of reciprocating shaft 4 is controllable.

The arrangement of sliding shaft 17 with respect to second shaft 6 allows reciprocating shaft 4 to contact different cross-sections of the interior wall 3 of drum 1. This variation of contact profiles may be accomplished through a mechanism such as that of control arm 7, as seen in FIG. 1. Control arm 7 is attached to sliding shaft 17 in such a manner that it does not interfere with the rotation of sliding shaft 17. By moving control arm 7 back and forth, the amount by which sliding shaft 17 penetrates into drum 1 is adjustable. As discussed above, sliding shaft 17 can move longitudinally with respect to second shaft 6 while the two are held together with respect to rotational motion about axis 16.

Operation of the transmission will now be discussed. For purposes of explanation, the first shaft will be considered an input shaft in the following discussion.

Assume initially that the control arm 7 is used to place reciprocating shaft 4 as far into drum 1 as it will go. This places rollers 10 in contact with interior wall 3 of drum 1 at cross-section C—C. We will assume that the cavity in drum 1 defined by interior wall 3 is formed such that the opening at cross-section C—C is a circle centered on axis 16. This end of the range of placement of reciprocating shaft 4 represents the lowest output/input ratio of the transmission. If the opening is centered as discussed above, the output/input ratio at this point is zero, as assumed in the remainder of the explanation. If the opening is off-center, the output/input ratio will be greater than zero.

If the first shaft 5, and hence drum 1, is rotated, no motion will be induced in reciprocating shaft 4, assuming frictionless contact between rollers 10 and interior walls 3. As discussed above, the profile of the interior walls 3 in contact with the rollers 10 is unvarying during rotation, therefore spinning of the drum 1 serves merely to spin rollers 10. Any resistance inherent in rollers 10 will tend to rotate reciprocating shaft 4, and hence sliding shaft 17 and second shaft 6. There is no tendency for shaft 4 to reciprocate.

If, however, control arm 7 is used to shift sliding shaft 17 so that reciprocating shaft 4 contacts interior walls 3 at cross-section B—B, the output/input behavior of the transmission is markedly different. Rotation of first shaft 5, and hence drum 1, presents an opening defined by interior walls 3 at B—B which is offset from axis 16. As drum 1 rotates, the opening rotates eccentrically about axis 16. Clearly, in the arrangement shown in FIG. 1, this displacement is at a minimum at cross-section C—C and a maximum at cross-section A—A. While the displacement was described above as being 0 at C—C, it need not be so if there is no need to provide an output/input ratio of 0.

With reciprocating shaft 4 in position B—B, rotation of drum 1 about axis 16 will tend to cause reciprocating shaft 4 to move back and forth in reciprocal fashion within cylinder 19. Assuming frictionless rollers 10 and no resistance to the linear motion within cylinder 19, no other motion will be induced in reciprocating shaft 4 or sliding shaft 17 as the opening travels about its eccentric orbit. Resistance to the linear motion of reciprocating shaft 4 will tend to induce rotational motion in reciprocating shaft 4 and, necessarily, sliding shaft 17.

As discussed above, reciprocal motion of reciprocating shaft 4 causes a flow of fluid back and forth between the subchambers created in fluid chamber 18 by baffle 9 or movable baffle 21. As either of these baffle arrangements provides resistance to fluid flow, resistance is in turn provided to reciprocal motion of reciprocating shaft 4. Because of this resistance, rotation of the first shaft 5 causes both reciprocal motion of reciprocating shaft 4 and rotational motion of both reciprocating shaft 4 and sliding shaft 17. The output/input rotation ratio is a function of the displacement of the center of the circular opening from axis 16 and the amount of resistance to the flow of fluid within fluid chamber 18.

Necessarily, the maximum output/input rotation ratio as a function of positioning of reciprocating shaft 4 occurs when the circular opening is at its greatest displacement from axis 16. In the transmission FIG. 1, this is the case at cross-section A—A.

This embodiment may be modified by essentially turning the drum/reciprocating shaft mechanism inside-out.

Instead of having the reciprocating shaft located inside the drum with the cavity inside the drum having the shape described above, the drum may be represented as a solid whose exterior has a shape similar to that of the cavity. In this case, one or more reciprocating shafts may ride in an element which surrounds the drum, reciprocating as the surrounding element and the solid drum rotate with respect to one another.

Figure 3:
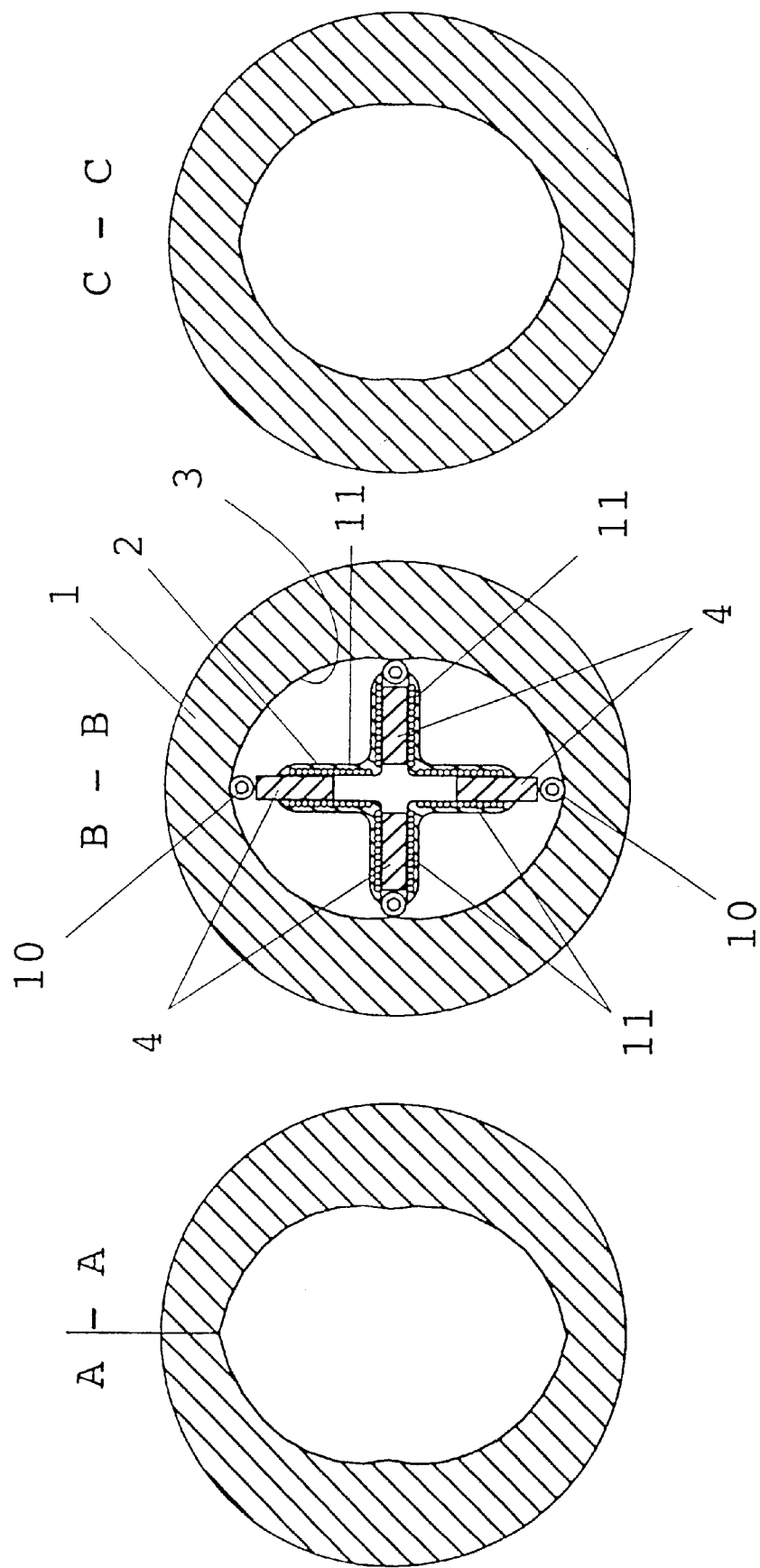
FIG. 3 is a cross sectional view according to a second embodiment of the invention, showing cross sections taken at the same locations A—A, B—B and C—C of FIG. 1.

A second embodiment is shown in FIG. 3, and is discussed below. Elements common to those disclosed in the first embodiment are identified with matching identification numbers.

In general, the operation of the transmission closely follows the properties discussed above. The principal difference lies in the shape of the cavity formed in drum 1 by walls 3 and the number and arrangement of reciprocating shafts 4.

In a manner similar to that of the previous embodiment, a low ratio end of drum 1 has a profile of the interior walls 3 at cross-section C—C which forms a circle centered on axis 16. As in the previous embodiment, the cross-sectional shape of the cavity changes over its length. The opening is circular or nearly so at the low ratio end and becomes increasingly flattened toward the high ratio end.

Figure 7:
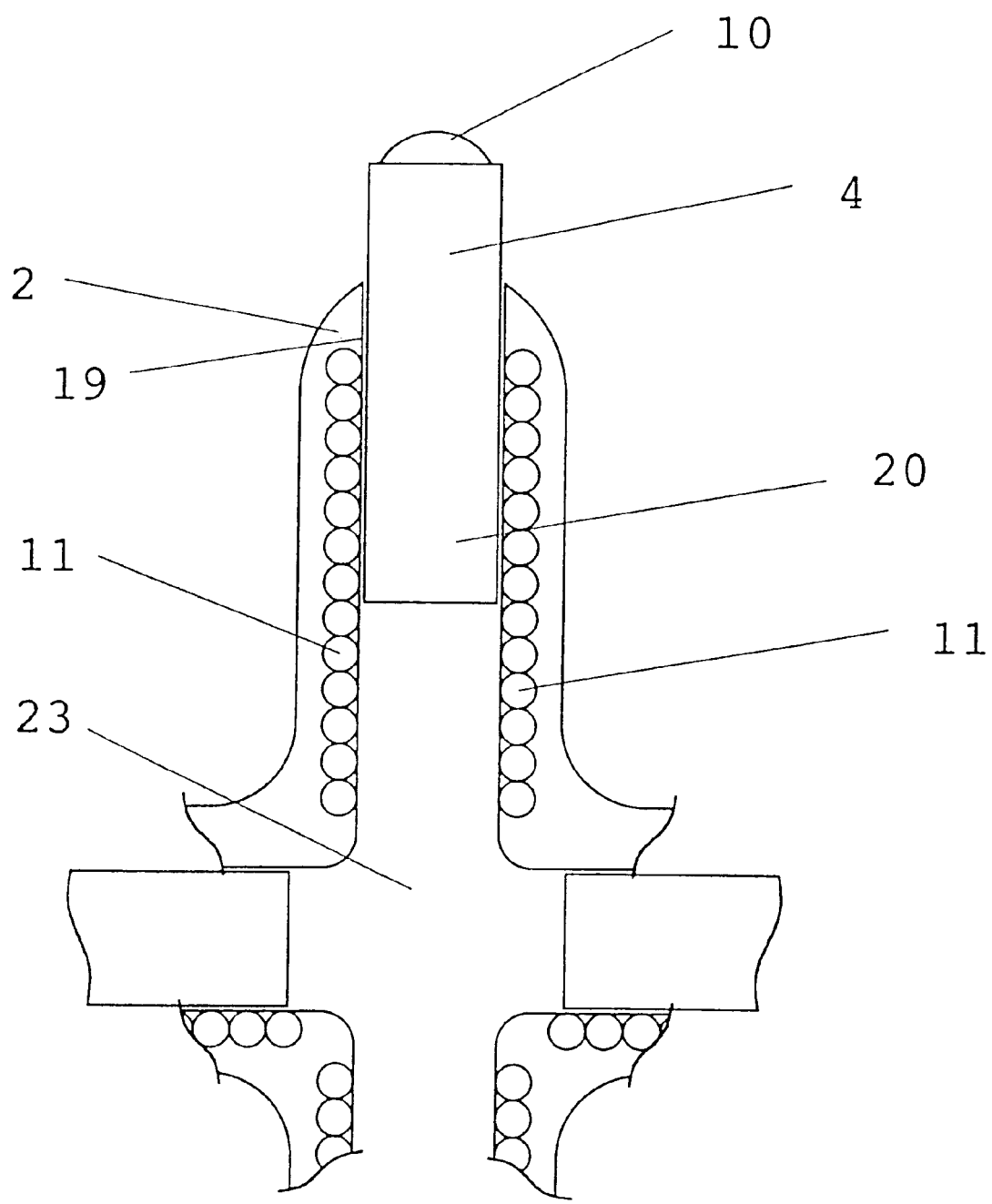
FIG. 7 is a detailed cross-sectional view of a portion of the third embodiment.

The single reciprocating shaft 4 of the previous embodiment is also replaced with a plurality of reciprocating shafts. As seen in FIGS. 3 and 7, each reciprocating shaft 4 is slidably disposed within a cylinder 19 formed in a sleeve 2. Each sleeve 2 projects from the transmission end of sliding shaft 17 essentially perpendicularly outward from axis 16. Instead of passing through its respective cylinder 19 and out the other side, as in the previous embodiment, each reciprocating shaft 4 terminates within its cylinder 19. Each cylinder 19 opens into a common fluid filled reservoir 23 within sliding shaft 17. A reservoir end of each reciprocating shaft 4 is fitted with a seal 20. Seals 20 prevents fluid in the reservoir from escaping the reservoir past reciprocating shafts 4.

The arrangements of reciprocating shafts 4, cylinders 19, and fluid reservoir 23 is such that movement of less than all of the reciprocating shafts 4 toward axis 16 necessitates the movement of at least one other reciprocating shaft 4 away from axis 16, by virtue of fluid displacement in fluid-filled reservoir 23. In this way, movements of the various reciprocating shafts 4 are interrelated.

Additionally, reciprocating shafts 4, the fluid in fluid-filled reservoir 23, and the cavity formed by interior walls 3 are interrelated such that at any cross-section from A—A to C—C, all rollers 10 are in contact with interior wall 3. It can be seen, therefore, that if control arm 7 were used to move reciprocating shafts 4 from C—C to A—A, or vise versa, without rotating drum 1, two of the four reciprocating shafts of FIG. 3 would move inward toward axis 16 and the other two would move away from axis 16. All four rollers 10 would be in contact with interior walls 3 throughout this travel.

Similarly, it can be seen that if reciprocating shafts 4 are placed at cross-section C—C and drum 1 is rotated, reciprocating shafts will reciprocate minimally. This minimal reciprocation will be 0 if the cross section of interior walls 3 at C—C is a circle. As the reciprocating shafts 4 are moved along the drum toward A—A, the reciprocal motion experienced by reciprocating shafts 4 will increase in magnitude as the profile of the interior walls 3 flattens.

The profile of the interior wall 3 at any point along the drum is defined by the requirement that the sum of the distances from axis 16 to the distal ends of reciprocating shafts 4 be constant. By extension, the same relationship applies to any two adjacent reciprocating shafts 4.

One shape which satisfies this criterion is based on a relationship of displacement distance as a function of rotational displacement similar to that of the previous embodiment, which incorporated a single shaft. Consider a pair of adjacent reciprocating shafts 4, disposed perpendicular to one another, wherein displacement of one shaft either inward or outward caused the equivalent but opposite displacement of the other. Stated another way, the sum of their displacement distances is a constant.

First, define a maximum/minimum position, in which one of the shafts is at maximum displacement from the center and the other is at the corresponding minimum. The difference between the two displacements represents the range of reciprocal travel of each shaft. If, as in the first embodiment, it is desired that the displacement be directly proportional to rotational displacement, the path of travel, and hence the shape of the profile of the interior wall 3 at a cross-section, can be easily defined. In this case, the shape of the cross-section has four segments and four discontinuities. The discontinuities at the minimum displacement point are inward pointing, while the discontinuities at the maximum displacement points point outward.

With such an arrangement, the behavior of the plural reciprocating shafts 4 is analogous to that of the single shaft 4 in the previous embodiment with no resistance to the reciprocal motion. Whereas in the previous embodiment resistance was achieved through limitations of flow of displaced fluid, resistance in the present embodiment is achieved through different means.

In this embodiment, the reciprocating shafts are constructed of disk shaped magnets layered lengthwise. An electrical coil 11 is disposed within each sleeve 2 so as to surround each magnetic reciprocating shaft 4. As each magnetic reciprocating shaft 4 moves through its respective coil 11, it induces current in the coil 11, resulting in resistance to such reciprocal motion.

In contrast with the previous embodiment, the fluid in this embodiment is not used as a source of resistance to reciprocal motion. The fluid in this embodiment is used to ensure corresponding outward motion of a subset of reciprocating shafts 4 as other shafts 4 are forced inward by rotating through the decreasing cross-section of interior wall 3.

The overall conversion of rotational motion of an input shaft into both reciprocal motion as well as rotational motion of an output shaft in varying proportions according to the profile of drum 1 is similar to that of the first embodiment, with a variation in the means of providing resistance to the reciprocal motion.

In both of the embodiments discussed thus far, the transition from the high ratio end to the low ratio end has been smooth. It is further possible that the walls 3 include step, so as to behave in a more incremental fashion.

Figure 4:
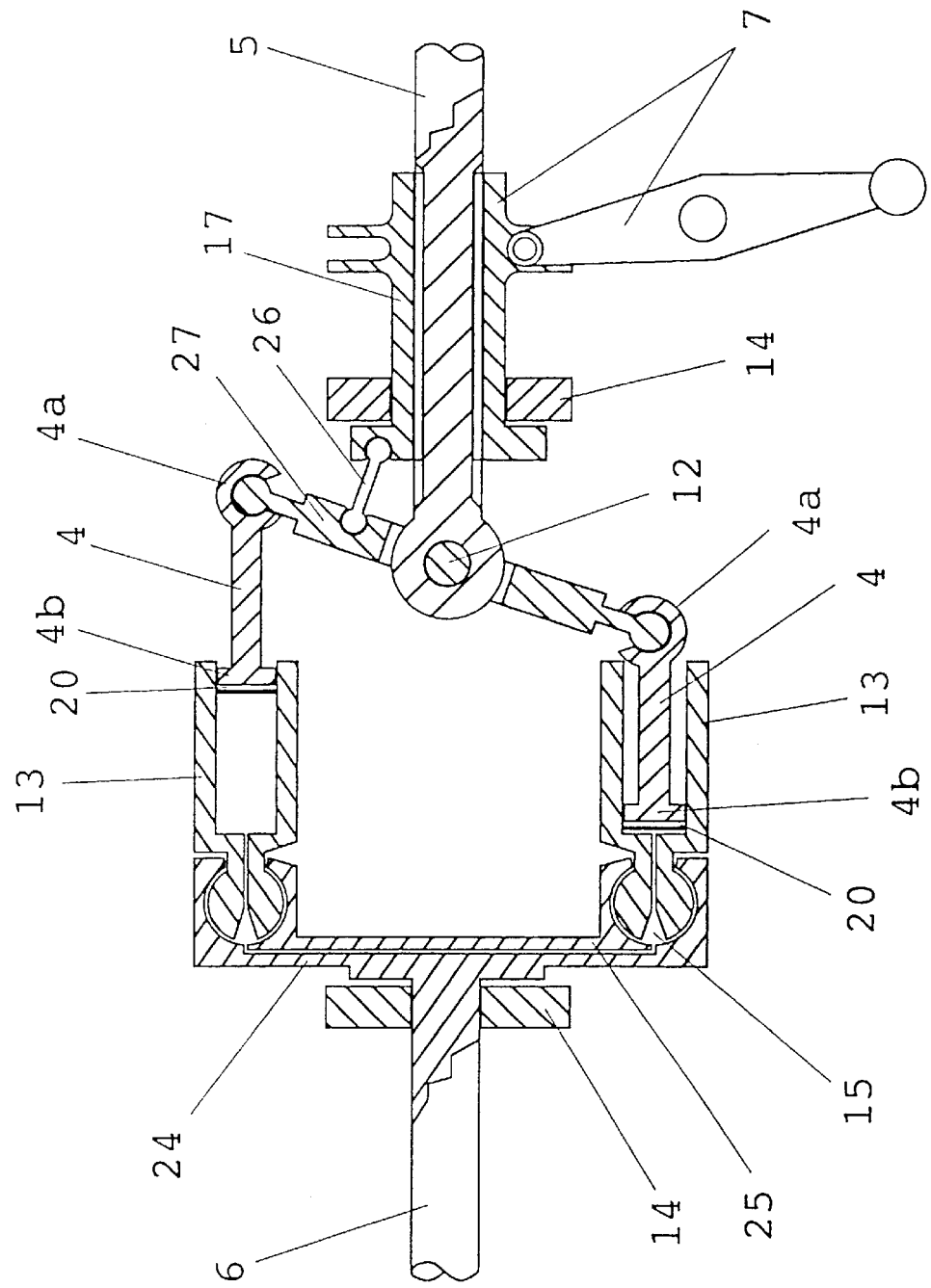
FIG. 4 is a sectional view according to a third embodiment of the present invention.

FIG. 4 shows a third embodiment of the invention. In this embodiment, The same principle of conversion of input rotational motion into both reciprocal motion and output rotational motion is followed. Common reference numbers are used where appropriate.

As is previous embodiments, control arm 7 is used to control the longitudinal relationship between sliding shaft 17 and a driving or driven rotating shaft, in this case first shaft 5. In this embodiment, first shaft 5 is connected, at its transmission end, to a pivoting rotor 27. This connection allows pivoting rotor 27 to rotate with first shaft 5 as well as pivot so that an axis of symmetry of pivoting rotor 27 may lie at a variable angle with respect to axis 16. This may be accomplished by having first shaft 5 terminate at its transmission end in a ring within which a pivot pin 12 of pivoting rotor 27 pivotably disposed. A clearance area in the center of pivoting rotor 27 allows this connection and allows pivoting rotor 27 to pivot through a predetermined range without contacting first shaft 5. Connecting rod 26 connects pivoting rotor 27 to sliding shaft 17, allowing control arm 7 to control the degree of pivot of rotor 27.

It can be seen that rotational motion of first shaft 5 will induce motion of pivoting rotor 27. If pivoting rotor 27 is perpendicular to axis 16, the motion will be entirely rotational within a single plane. If, however, rotor 27 is pivoted, the rotational motion of first shaft 5 will be translated into both rotational motion and reciprocal, linear motion.

The perimeter of pivoting rotor 27 is circular in cross-section, and is connected to the inner portion of the rotor via a neck portion, whose thickness is less than the diameter of the circular portion. Slidably attached to the circular perimeter are two reciprocating shafts 4. The attachment to pivoting rotor 27 is through a follower end 4a. Follower end 4a is shaped like a portion of a ring, the interior radius of which approximates the radius of the circular perimeter of pivoting rotor 27, allowing slidable contact therebetween. The ring portion of follower end 4a comprises greater than a half circle but less than a full circle. The ring portion of follower end 4a is designed to keep reciprocating shaft 4 in slidable contact with pivoting rotor 27 without separating therefrom, while allowing rotor 27 to pivot through a predetermined range of motion.

The other distal end of reciprocating shaft 4 is a compression end 4b, which fits slidably within an open end of a cylinder 13. Seal 20 maintains a seal between reciprocating shaft 4 and cylinder 13. A closed end of cylinder 13 is hingably attached to a non-pivoting rotor 24. Rotor 24 is attached to a transmission end of second shaft 6, and rotates therewith. The pivoting connection between cylinder 13 and non-pivoting rotor 24 allows cylinder 13 to move through a range necessary to accommodate the range of positions taken by reciprocating shaft 4 induced by the pivoting of rotor 27.

Cylinder 13 also comprises a cylinder fluid passage 15 which passes through the closed end of cylinder 13 to the closed end thereof. The opening in the end of cylinder 13 created by cylinder fluid passage 15 is aligned with an end of a rotor fluid passage 25, which connects the various cylinder fluid passages and, hence, the interiors of the various cylinders. Cylinder fluid passages 15 and rotor fluid passage 25 are designed at their meeting point so that flow between the two is accommodated throughout the full range of the hinge connection between cylinder 13 and rotor 24. The cylinders 13 and fluid passages 15 and 25 are filled with fluid, and movements of reciprocating shafts 4 are interrelated due to fluid displacement.

In operation, the transmission behaves according to the same general principles of the previous embodiments. Rotation of first shaft 5 induces motion of pivoting rotor 27. If rotor 27 is arranged using control arm 7 so that it is perpendicular to axis 16, the motion of rotor 27 will be purely rotational, in an unvarying plane. With rotor 27 in a single plane, there is no tendency to induce reciprocal motion in reciprocating shafts 4. Assuming frictionless contact between rotor 27 and follower ends 4a of reciprocating shafts 4, there is similarly no tendency to induce rotational motion into the reciprocating shafts 4 and the attached cylinders 13 and rotor 24.

If pivoting rotor 27 is pivoted with respect to axis 16, rotation of first shaft 5 will cause rotor 27 to rotate with a wobble. Instead of remaining in a single plane, the plane of rotor 27 will be constantly varying. In this case, the wobble of rotor 27 will tend to induce reciprocal motion in reciprocating shafts 4, the degree of which is a function of the amount of pivot of rotor 27. Assuming there is no resistance to this reciprocal motion, there is still no tendency to induce rotational motion in the reciprocating shafts 4, cylinders 13, and non-pivoting rotor 24. If, however, there is such resistance to reciprocal motion, a portion of the reciprocal motion will be translated into rotational motion. This resistance may be supplied by the restricted flow of the fluid which must be displaced by the reciprocal motion.

Necessarily, the output/input rotation ratio of the transmission is a function of the amount of pivot of rotor 27 and the resistance to the reciprocal motion caused by fluid displacement.

In the embodiments discussed above, first shaft 5 was treated as the input shaft and second shaft 6 as the output shaft. The nature of this transmission is such that either shaft may serve equally well in either capacity.

Further, in the embodiments which rely on fluid displacement for controlling resistance to reciprocal motion, the fluid mechanism may be entirely dispensed with. In this case, the resistance to reciprocal motion may be provided, in part, by the mass of the reciprocating shafts itself, which tends to resist changes in motion. Of course, the greater the mass, the greater the resistance.

Additionally, while the embodiments considered above all included a common axis of rotation for the input and output shafts, this is not necessitated by the invention. The shafts may be parallel or even slanted with respect to one another. In this case, changing the displacement can be achieved through varying the distance between the input and output shaft, or changing the angle between the two axes of rotation.

Whereas modifications of the present invention will no doubt be apparent to a person having ordinary skill in the art to which the invention pertains, it is to be understood that the embodiments shown and described by way of illustration are by no means intended to be considered in a limiting sense. Accordingly it is intended for the claims to cover all modifications of the present invention which fall within the spirit and scope of the invention.

What is claimed is:

1. A transmission comprising:

a first shaft;

a second shaft, axially slidable with respect to the first shaft;

a drum attached to a transmission end of the first shaft, said drum having a contact surface whose cross-section varies over a length of the drum, the contact surface defining an interior cavity disposed within the drum;

at least one reciprocating shaft, the at least one reciprocating shaft being slidably attached to a transmission end of the second shaft through at least one perpendicular passage in the second shaft, the at least one reciprocating shaft being able to slide along an axis which is generally perpendicular to a rotational axis of the second shaft, at least one end of each of the at least one reciprocating shaft being in slidable contact with the contact surface of the drum throughout a full rotation of the drum, rotation of the drum being able to induce reciprocal motion of the reciprocating shaft through a displacement range;

a groove disposed on a surface of the reciprocating shaft, wherein an interior surface of the groove and an interior surface of the perpendicular passage together form a fluid chamber, and wherein the groove is arranged such that throughout a full range of the reciprocal motion of the reciprocating shaft, the groove is contained within the perpendicular passage;

fluid contained within the fluid chamber;

seals which prevent the fluid from leaking from the fluid chamber; and at least one baffle disposed on the interior of the perpendicular passage, creating a plurality of fluid subchambers, wherein the reciprocal motion of the reciprocating shaft within the perpendicular passage causes a flow of the fluid from one of the subchambers to another of the subchambers;

wherein a contact path between the at least one reciprocating shaft and the contact surface of the drum is adjustable through the axial sliding of the first shaft with respect to the second shaft, the contact path at a low ratio end of the cavity being generally circular and centered on an axis of rotation of the first shaft, the contact path at the high ratio end being generally heart-shaped, the cavity smoothly transitioning over its length between the two end contact paths; and wherein the induced displacement range generally increases as the at least one reciprocating shaft is located closer to the high ratio end of the drum.

2. The transmission of claim 1, further comprising rollers rotatably attached at distal ends of the at least one reciprocating shaft, wherein the rollers are arranged to contact the contact surface of the cavity.

3. The transmission of claim 2, wherein placement of the at least one reciprocating shaft at the low ratio end of the cavity tends to induce a minimum amount of the reciprocal motion in the at least one reciprocating shaft upon rotation of the first shaft, and placement of the reciprocating shaft at an opposite end of the cavity tends to induce a maximum amount of the reciprocal motion in the reciprocating shaft upon rotation of the first shaft; and wherein the output/input ratio of the transmission varies according to an amount of the reciprocal motion induced in the reciprocating shaft.

4. The transmission of claim 1, wherein the at least one baffle, by restricting a rate of flow of the fluid between the subchambers, provides resistance to the reciprocal motion.

5. A transmission comprising:

a first shaft;

a second shaft, axially slidable with respect to the first shaft;

a drum attached to a transmission end of the first shaft, said drum having a contact surface whose cross-section varies over a length of the drum, the contact surface defining an interior cavity disposed within the drum;

at least one reciprocating shaft, the at least one reciprocating shaft being slidably attached to a transmission end of the second shaft through at least one perpendicular passage in the second shaft, the at least one reciprocating shaft being able to slide along an axis which is generally perpendicular to a rotational axis of the second shaft, at least one end of each of the at least one reciprocating shaft being in slidable contact with the contact surface of the drum throughout a full rotation of the drum, rotation of the drum being able to induce reciprocal motion of the reciprocating shaft through a displacement range;

a fluid chamber disposed within the at least one reciprocating shaft, the fluid chamber being divided into a plurality of fluid subchambers, wherein the reciprocal motion of the at least one reciprocating shaft causes fluid to flow between the subchambers against a fixed resistance.

6. The transmission of claim 5, further comprising a groove disposed on a surface of the reciprocating shaft, wherein an interior surface of the groove and an interior surface of the perpendicular passage together form the fluid chamber, and wherein the groove is arranged such that throughout a full range of the reciprocal motion of the reciprocating shaft, the groove is contained within the perpendicular passage.

7. The transmission of claim 6, further comprising at least one baffle disposed on the interior of the perpendicular passage to define the plurality of fluid subchambers.

8. The transmission of claim 7, further comprising seals which prevent the fluid from leaking from the fluid chamber.

9. The transmission of claim 8, wherein a contact path between the at least one reciprocating shaft and the contact surface of the drum is adjustable through the axial sliding of the first shaft with respect to the second shaft, the contact path at a low ratio end of the cavity being generally circular and centered on an axis of rotation of the first shaft, the contact path at the high ratio end being generally heart-shaped, the cavity smoothly transitioning over its length between the two end contact paths; and wherein the induced displacement range generally increases as the at least one reciprocating shaft is located closer to the high ratio end of the drum.

10. The transmission of claim 5, wherein a contact path between the at least one reciprocating shaft and the contact surface of the drum is adjustable through the axial sliding of the first shaft with respect to the second shaft, the contact path at a low ratio end of the cavity being generally circular and centered on an axis of rotation of the first shaft, the contact path at the high ratio end being generally heart-shaped, the cavity smoothly transitioning over its length between the two end contact paths; and wherein the induced displacement range generally increases as the at least one reciprocating shaft is located closer to the high ratio end of the drum.

11. The transmission of claim 10, further comprising a groove disposed on a surface of the reciprocating shaft, wherein an interior surface of the groove and an interior surface of the perpendicular passage together form the fluid chamber, and wherein the groove is arranged such that throughout a full range of the reciprocal motion of the reciprocating shaft, the groove is contained within the perpendicular passage.

12. The transmission of claim 11, further comprising at least one baffle disposed on the interior of the perpendicular passage to define the plurality of fluid subchambers.

13. The transmission of claim 12, further comprising seals which prevent the fluid from leaking from the fluid chamber.

* * * * *